Sept. 7, 1965     H. W. JACOBSON     3,205,042
FLUIDIZED PROCESS FOR PRODUCING CARBIDES
Filed Oct. 17, 1961
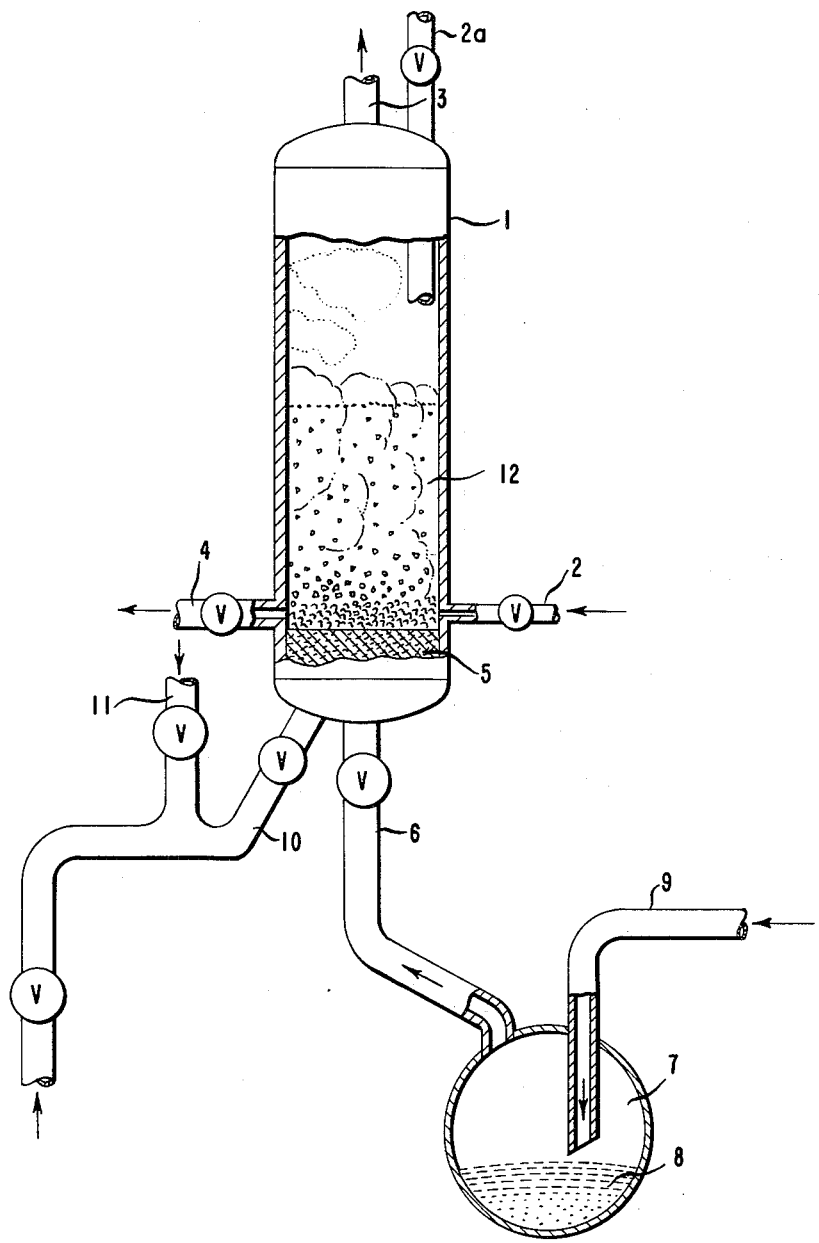
INVENTOR
HOWARD W. JACOBSON
BY *Francis J. Crowley*
ATTORNEY 3,205,042
FLUIDIZED PROCESS FOR PRODUCING CARBIDES
Howard W. Jacobson, Wilmington, Del., assignor to E. I. du Pont de Nemours and Company, Wilmington, Del., a corporation of Delaware
Filed Oct. 17, 1961, Ser. No. 145,593
10 Claims. (Cl. 23—208)

This invention relates to the production of carbides.

More particularly, it relates to a process in which a halide of an element is reduced in the presence of carbon, thus resulting in the formation of a carbide having the same shape or configuration as the original carbon. Carbides of the following elements may be produced according to this invention: chromium, columbium, iron, molybdenum, silicon, tantalum, titanium, tungsten, vanadium, and zirconium. The invention also provides a means whereby the carbide produced is composed of carbides of more than one element. This embodiment of the invention is accomplished by the simultaneous reduction of the halides of two or more of the above-specified elements.

The process of this invention comprises reacting in an enclosed reaction zone carbon, a volatile halide of an element from the group consisting of chromium, columbium, iron, molybdenum, silicon, tantalum, titanium, tungsten, vanadium, and zirconium, and a reducing agent from the group consisting of aluminum, hydrogen, and combinations thereof. The carbon should be in the form or shape desired in the carbide structure which is produced in this invention. By carrying out the reduction of the halide in the presence of the carbon, there is formed the carbide of the element being reduced which possesses the shape of the original carbon. In instances where the carbides of chromium, titanium, or zirconium are being produced, the reducing agent should be either aluminum alone or a mixture of aluminum and hydrogen. Hydrogen by itself will not completely reduce the halides of these elements all the way to the metal. With these metals, the use of hydrogen will effect only a partial reduction to the lower halides. Reaction temperatures are in the range of about 700° C. to about 950° C. Preferably, the carbon is present in the reactor as a fluidized bed of carbon particles.

In cases where aluminum is used as the reducing agent or as one of the reducing agents, there should be present in the reactor a bed of inert material, for example, alumina or silica; or an alloy of titanium and aluminum or of zirconium and aluminum. When both carbon and an additional bed material are present, particle size and the comparative densities of the additional bed material and the carbon are such that the carbon particles are, for the most part, located in the upper part of the bed, while the non-carbon bed particles largely constitute the bottom portion of the bed. There will, of course, be some intermixing of particles of the two materials. When aluminum is used as the reducing agent, it is fed through an inlet at or near the top of the reactor. The volatile halide used to produce the element for carbide formation is fed through an inlet at the bottom of the reactor together with a sufficient flow of an inert gas, to maintain the bed in a fluidized condition. In cases where hydrogen is used as the reducing agent, or as one of a combination of reducing agents, the flow of hydrogen may be maintained in admixture with the inert gas feed, or it may be introduced separately to the reactor.

The attached drawing illustrates an apparatus which can be used to carry out the process of this invention.

This drawing shows a vertically disposed, cylindrical-type reactor 1 which can be composed of pure silica, silica glass, stainless steel or other material which, under prevailing reduction conditions, will not be attacked by the reactants, products, and reaction by-products. The reactor is provided with inlet conduits 2 and 2a, and outlet conduits 3 and 4. Conventional-type electrical or other desired furnacing means can be externally associated with the reactor to heat and maintain it and its contents at temperatures ranging from about 700° C. to 950° C. Suitably disposed in the bottom or lower portion of the reactor, and functioning to support or retain the fluidizable bed particles 12 when in repose therein, is a perforated grid or porous filter 5 which is also composed of a material which is inert to the action of the gases fed into the reactor. Also provided in the bottom of the reactor is a valve-controlled inlet conduit 6 which is in open communication with a generator or vaporizer 7 and through which a vaporized compound of the element to be reacted with the carbon can be fed. The vaporizer can be enclosed within or otherwise suitably associated with an electrical or other form of desired heating means to maintain it at any desired temperature and effect vaporization of a volatile metal compound 8 previously charged thereto via a conduit 9. The conduit 9 can also be used to introduce an inert carrier gas (argon, helium, etc.) along with the vaporized compound to be reduced. A separate valve-controlled inlet conduit 10 is also provided in the reactor bottom, through which hydrogen is charged to the reactor. An associated valve-controlled auxiliary conduit 11 communicates with the conduit 10 through which an inert gas diluent (argon, helium, etc.) can be mixed with the hydrogen reducing-gas feed when assistance and promotion of the fluidization of bed particles in the reactor is desired. When a reaction is being carried out in which only a gaseous reducing agent is employed, the valve in the inlet conduit 2a may be closed. When a metallic reducing agent is employed, this may be added through the inlet conduit 2a. If a combination of gaseous and metallic reductants is used, these may be fed through both conduit 2a and conduit 10. Outlet 4 may be used to discharge the bed, or portions thereof, from the reactor. The bed material 12 may be carbon and/or an inert material such as alumina or silica of —20 to +120 mesh; or it may be composed of particles of carbon and an alloy of aluminum and titanium or of aluminum and zirconium. When the process of this invention is being used to produce the carbide of any of the metals named above whose compounds are completely reducible by means of hydrogen, or when a combination of these carbides is being produced, the reaction may proceed without the use of inert bed materials. However, if a combination of metallic and gaseous reducing agents is to be employed, at least a portion of the bed material should be inert particles in order to provide surface upon which the reduction of the volatile compound by the metal reducing agent may take place. Alternatively, the bed may be composed solely of inert particles, and the carbon may be hung in the reactor above the bed of inert material. The carbon used should be in the shape desired in the final product. In certain uses, this may mean irregularly shaped particles which can be used as part of the fluidized bed. In other instances, the carbon to be converted to carbide may be woven or felted material. When such materials are used, they are usually hung in the reactor above the fluidized bed. Carbons possessing a honeycomb structure have been used to produce carbide particles having such a structure. When these honeycomb carbide particles are crushed, acicular particles result. These acicular carbides are useful in powder metallurgical compacts where they produce a reinforcing effect. Carbide fibers prepared by using graphite batting as the carbon reactant are useful as reinforcing materials for ceramics, metals, and plastics.

In operating the apparatus shown in the drawing, a continuous flow of inert gas is begun through conduit 10, so that the bed becomes fluidized. The particle size of the carbon material, if the carbon is to be a part of the fluidized bed, should be so chosen that this portion of the bed will be lighter and will remain, for the most part, segregated above the inert bed. The reactor 1 and bed 12 are then brought to a preferred operating temperature in the range of about 700° C. to about 950° C., depending on the composition of the carbide product to be prepared, the rate of gas flow, the size of the reactor, heat losses, and other related factors. The reactor is heated to the desired temperature by applying external heat through the associated furnacing means. A portion of the heat required for the reaction may be supplied by preheating the gases which are fed through conduit 10. When the desired bed temperature is reached, a flow of volatile compound to be reduced, preferably one or more volatile halides, for example silicon tetrachloride, titanium tetrachloride, tungsten hexachloride, or zirconium tetrachloride, or a combination of volatile compounds to be reduced, is begun from the vaporizer 7 through conduit 6 to the reactor. If a metal reducing agent is to be used, this is fed through inlet conduit 2a. The rate of introduction of the metal is controlled so that unreacted molten metal does not build up and cause the bed particles to stick together.

Where the volatile compound to be reduced is a halide of chromium, columbium, iron, molybdenum, silicon, titanium, tantalum, tungsten, vanadium, or zirconium, either a metal reducing agent, or a combination of metal reducing agent and hydrogen may be used as the reductant. If a halide of columbium, iron, molybdenum, tantalum, tungsten, or vanadium is to be reduced, hydrogen alone has been found to be quite satisfactory at temperatures in the range of 700° C.–950° C. If a halide of silicon is to be reduced, hydrogen alone may be used, provided the temperature is maintained in the range of about 900–950° C. If the reduction of a silicon halide is to be carried out in the reactor at a temperature below about 900° C., or an increase in yield of silicon carbide when operating at a higher temperature is desired, a combination of metallic and gaseous reducing agents may be used. Certain specific conditions of operation have been found necessary, however, when a combination of aluminum and hydrogen is used to achieve the objects of this invention in the production of silicon carbide. In order to avoid a sticking of the bed of inert particles because of a build-up of molten aluminum in this portion of the reactor, it has been found that a small amount of titanium halide or of zirconium halide must be introduced into the reactor simultaneously with the introduction of some of the metal reductant and prior to the introduction of the silicon halide which is to be reduced. It is thought that the titanium or zirconium halide is partially or completely reduced to the metal on the surface of the inert particles, and that the product of this reduction then combines with aluminum to form an aluminum-rich alloy on the surface of the inert particles. This alloy, of higher melting point than the aluminum which is being fed, prevents the sticking together of the inert particles in the bed. In support of this theory, it has been found possible to produce carbides according to this invention by using aluminum in the form of an aluminum-titanium alloy.

The amount of reducing agent which is used in the operation of this invention is not particularly critical. The amount used should be in excess of the stoichiometric quantity required to completely reduce the volatile halides to the metal which is to be combined with the carbon, but the excess need be only a slight excess. When a combination of the two reducing agents hydrogen and aluminum is used, the aluminum acts as the predominant reductant. Therefore, to insure good yields when using a combination of reducing agents, it is advisable to employ at least a stoichiometric quantity of aluminum to effect reduction of the halide to the metal for subsequent reaction with the carbon.

Although in the preferred method of operation of this invention, the carbide formation is carried out in a fluidized bed reactor, it is entirely possible to employ a fixed bed within a reactor and to locate at or near the exit of the reactor the material to be made into carbide. It would be possible to carry out the reaction by supplying a fixed bed of particles of Ti-Al alloy. An alloy of Ti and Al is easily prepared by arc melting the metals together and crushing the alloy product. Titanium tetrachloride should be introduced into the fixed bed reactor upstream of this Ti-Al bed. The carbon object or objects to be formed into carbides should be placed near or at the exit end of the reactor. The amounts of reactants and the temperatures of operation for such a fixed bed would be the same as for the operation of a fluidized reactor. In a similar manner, a Zr-Al alloy might be used as a fixed bed within the reactor and $ZrCl_4$ fed into the reactor upstream of the alloy to form zirconium carbide in any desired shape. If hydrogen is to be used as one of the reductants in the reaction, it may be introduced along with the metal halides.

The method by which the reduction of the volatile halide and the subsequent formation of the carbide takes place is not completely understood. However, it is believed that the reducing agent and the volatile react to form partially reduced compounds. The presence of an inert bed material facilitates this reaction by providing surface whereon the reduction reaction may take place. As these partially reduced compounds come in contact with additional reducing agent in the presence of the carbon in the upper portion of the reactor, further reduction takes place so that the cation portion of the halide is reduced to the elemental state, whereupon the element further reacts with the surface of the carbon to form a carbide.

For a clearer understanding of the invention, the following specific examples are given. These examples are intended to be merely illustrative of the invention and not in limitation thereof. Unless otherwise specified, all parts are by weight.

*Example 1*

This example illustrates the formation of TiC using aluminum as the reducing agent.

A cylindrical silica reactor, as shown in the drawing, 41 mm. in diameter and 30.5 cm. in length, was used in this example. This reactor was charged with 100 g. of Alundum of particle size —90 +120 mesh, and on top of these particles, there was placed 35 g. of activated wood charcoal of particle size —20 +40 mesh. By means of external heating, the reactor temperature was brought to 825° C. while a flow of argon of 2.0 liters per minute (measured at room temperature) was used to fluidize the bed of Alundum and carbon. With the reactor temperature maintained at 825° C., a feed of $TiCl_4$ was begun through the bottom inlet feed of the reactor while at the same time a feed of aluminum particles (—40 +60 mesh) was begun through the top-feed inlet. Over a period of 2 hours, a total of 124 g. of $TiCl_4$ was vaporized to the reactor, and 25 g. of Al was fed through the top inlet.

At the conclusion of the 2-hour run, the reactor was cooled under a flow of argon, and the bed was removed from the reactor. The bed was screened and the portions of two separate particle sizes thus separated. The larger particle size fraction was now completely composed of metallic gray particles of the same configuration as the original carbon particles in the bed. The composition of these gray metallic particles was determined by X-ray diffraction analysis to be predominantly TiC.

The larger particle size portion of the bed which originally weighted 35 g. was found to weigh 62 g. at the conclusion of the reaction. This increase in weight represents an 87% conversion to TiC of the Ti values fed to the reactor.

Example II

This example illustrates the production of TiC particles by the use of a combination of solid (Al) and gaseous ($H_2$) reducing agents.

Using the same reactor and the same general procedure as is described in Example I, a bed of 100 g. of Alundum and, above this, 25 g. of activated charcoal, was fluidized by a flow of 1.0 liter per minute of argon. The temperature of the bed was raised to 800° C. and a flow of 0.5 liter per minute of hydrogen was added to the fluidizing gas feed. Over a period of 1¾ hours, 100 g. of $TiCl_4$ was fed through the bottom inlet and 15 g. of aluminum (−40 +60 mesh particle size) was added at the top of the reactor.

At the conclusion of the 1¾ hour run, the reactor was cooled under a flow of argon and the bed removed from the reactor. By screening, the larger particle size fraction of the bed, consisting of gray metallic particles, as in Example I, was separated from the smaller particle size Alundum portion of the bed. The weight of the larger particles size fraction of the bed had increased by 23 g. This increase in weight represents a 91% conversion to TiC of the Ti values fed to the reactor.

The metallic-appearing particles were determined by X-ray diffraction technique to be predominantly TiC, and were in the same shape as the original carbon particles used in the bed.

Example III

In this example, ZrC is formed in the configuration of the original carbon particles by reduction of $ZrCl_4$ using a combination of metallic and gaseous reducing agents.

Following the procedure of Example I, a bed comprising 100 g. of −90 +120 mesh particle size Alundum and, above this, 8 g. of activated charcoal (−20 +40 mesh particle size) was fluidized by a flow of 1 liter per minute of hydrogen. The temperature of the reactor was maintained at 850° C., and over a period of 30 minutes, 19 g. of $ZrCl_4$ vapor was introduced into the bottom feed inlet of the reactor, and 6 g. of Al (−40 +60 mesh size) was added through the top inlet.

The reactor was then cooled (under inert gas flow) and the bed sieved to separate the different particle-sized fractions. The larger-sized fraction was found to be comprized of gray metallic particles of the same shape as the carbon particles used in the reactor charge. X-ray diffraction analysis showed the surface of these particles to be ZrC.

The increase in weight of this fraction of the bed was 6.5 g. which is an 88% conversion of the Zr values in the $ZrCl_4$ fed.

Example IV

In this example, aluminum is used as the sole reducing agent in the preparation of ZrC.

Using the same sized reactor and the same general conditions as are described in the previous examples, a reaction was carried out using a bed of 100 g. of Alundum, 10 g. of activated charcoal, a fluidizing gas feed of 1.8 liters per minute of argon and a temperature of 850° C. Over a 40-minute period, 8 g. of aluminum was fed through the top feed inlet and 22 g. of $ZrCl_4$ vapor was fed into the reactor through the bottom inlet. The reactor was then cooled, and the two separate particle-sized bed fractions were recovered by screening. It was found that the larger-sized fraction of the bed had increased 7.1 g. in weight and that the metallic gray particles, still in the shape of the original carbon particles, were composed predominantly of ZrC (X-ray diffraction analysis). An 82.5% conversion of the Zr values to ZrC was realized in this example.

Example V

This example illustrates the operation of the invention as applied to the reduction of $SiCl_4$ using Al and $H_2$ as reducing agents to produce silicon carbide in the shape of the original carbon particles of the reactor charge.

For this example, a silica reactor of the same dimensions as given in Example I was used. The solids in the reactor comprised 100 g. Alundum (−90+120 mesh size) and, superimposed on this, a bed of 8 g. of activated charcoal. The bed was fluidized by introducing through the bottom inlet of the reactor a mixture of 0.9 liter per minute of hydrogen and 1.1 liters per minute of argon, and the temperature was maintained at 850° C. The reaction to produce SiC was initiated by introducing through the top inlet granular Al (−40 +60 mesh particle size) and simultaneously introducing through the bottom inlet over a period of 5 minutes 2.0 g. $TiCl_4$. At the end of 5 minutes, the feed of $TiCl_4$ vapor was replaced by a feed of $SiCl_4$ vapor and the feeding of Al through the top inlet was continued. The feed of Al and $SiCl_4$ was continued for one hour, during which period 20 g. of Al and 98 g. $SiCl_4$ were fed. The reactor was cooled under a flow of inert gas, and the reactor bed was dumped and sieved. The coarser portion comprised particles which were gray and metallic in appearance, but appeared to be of the same dimensions and configuration as the carbon which was in the reactor at the beginning of the run. The product was identified by X-ray diffraction as SiC.

The weight of the larger particle size fraction of the recovered bed material was 21 g., a weight gain of 13 g. over the weight of the carbon charged to the bed. This weight gain shows an 81% conversion of the Si values fed to the reactor.

Example VI

This example will illustrate the formation of TiC in the form of fibers. Following the procedure given in Example I, a bed comprising 100 g. Alundum (−90+120 mesh particle size) and above this, 8 g. of carbon fibers (commonly referred to as graphite batting) was introduced into a reactor. The bed was fluidized by the introduction of 1.5 liters per minute of argon and the reactor and its contents were heated to 800° C., and this temperature was maintained during the reaction period. Over a period of 1 hour, 30 grams of $TiCl_4$ vapor was fed to the reactor, and simultaneously, 5.5 g. of aluminum (−40+60 mesh size) was fed to the reactor through the top inlet. The bed was then cooled under a flow of argon and separated into two portions by screening. The carbon fibers were found to be completely covered by a gray metallic coating which was identified by X-ray diffraction analysis as predominantly TiC. The original shape of the fibers was retained in the carbide product, and an increase in weight of 6 g. was found. A yield of 80% was realized in the recovery of Ti from $TiCl_4$ fed.

Example VII

It has been found that if the temperature of operation is kept at 900° C. or above, the process of this invention may be carried out to produce silicon carbide in the same shape as carbon which is initially present in the reactor, by employing hydrogen alone as a reducing agent. This example will illustrate this application of the invention.

A silica glass reactor of 21 mm. inside diameter and 30.5 cm. in length was charged with 10 g. of activated charcoal of −20+40 particle size. A flow of hydrogen of 2.2 liters per minute was used, and the bed fluidized by this flow of gas was heated to 900° C. When this temperature was reached, a flow of $SiCl_4$ was begun from the bottom feed inlet, and over a period of one hour, 100 g. of $SiCl_4$ was added to the reactor. After one hour, the reactor was cooled, the bed still under hydrogen atmosphere, and the reactor contents were discharged. The bed weight was found to be 19.1 g.

The product was examined by X-ray diffraction analysis and was found to be predominantly SiC. The increase in weight represents a 55% conversion of the silicon values fed to the reactor. The carbide particles were of the same shape as the carbon charged to the bed.

*Example VIII*

This example will illustrate the formation of tungsten carbide according to the process of this invention using hydrogen as the reducing agent.

The reactor in this experiment consisted of a silica glass tube, 22 mm. inside diameter and 30.5 cm. in length, and the bed comprised 10 g. of −20+40 mesh particle size activated charcoal. The reactor and contained bed material were heated to 750° C., while the bed was being fluidized by the upward flow of 1.2 liters per minute of hydrogen. Over a period of 2 hours, 174 g. of $WCl_6$, vaporized from an outside reservoir, was fed through the bottom feed inlet. At the conclusion of the two-hour reaction time, the reactor and bed were cooled (the flow of hydrogen being continued through this period) and the charge was emptied from the reactor.

The product was of the same shape and particle size as the original carbon placed in the bed. X-ray diffraction analysis showed the presence of three forms of carbide: $\alpha W_2C$, $\beta W_2C$, and $WC$. The bed weight increased 74 grams during the reaction. This is a 91% yield on the tungsten values fed to the reactor.

*Example IX*

The formation of mixed carbides of zirconium and titanium was carried out using a reactor as described in Example VIII. A bed of 100 g. of Alundum (−90+120 mesh size) and above this 10 g. of activated charcoal (−20+40 mesh size) was introduced into the reactor. The bed was fluidized by the upward flow of 1.9 liters/minute of argon and the reactor with its contents was heated to 825° C., and this temperature was maintained throughout the run. Over a period of one hour, 18 g. of $ZrCl_4$ and 90 g. $TiCl_4$ were vaporized simultaneously into the bottom feed inlet of the reactor, and 34 g. of aluminum powder was fed through the top feed inlet.

After all of the reactants had been introduced, the reactor was cooled under a continued flow of argon, and the contents of the reactor then removed. The bed material was screened and the coarser fraction was found to be of the same shaped particles as the original carbon portion of the bed, and to weigh 34.5 g. X-ray diffraction analysis showed the product to be $ZrC$ and $TiC$. Chemical analysis of the product showed that 78% of the Zr values and 84% of the Ti values fed to the reactor had been recovered in the mixed carbide product.

*Example X*

Using the same procedure as described in the foregoing examples, an alloy of $TiAl_3$ was used as a reductant to produce a mixture of $ZrC$ and $TiC$ as follows:

A bed of 20 g. of $TiAl_3$ alloy (−40+60 mesh particle size) was introduced into a reactor 22 mm. in diameter and 30.5 cm. in length. This alloy had been prepared by arc-melting titanium and aluminum together and crushing the product. A 2 g. portion of activated charcoal (−20+40 mesh) was introduced into the reactor, and the bed was fluidized by the upward flow of 1.0 liter per minute of argon. The temperature was brought to 825° C. and held at this point for the duration of the run. Over a period of one hour, 20 g. of $ZrCl_4$ were introduced into the reactor. After cooling and emptying the reactor, 11.5 g. of the coarser fraction of the bed material were recovered. This product was found to be in the shape of the carbon particles charged to the reactor, and X-ray diffraction analysis showed the product to be mixed carbides of zirconium and titanium.

*Example XI*

This example will illustrate the formation of titanium carbide in the form of woven material.

The same procedure was followed as is given in Example VI, except that, instead of graphite batting, a piece of graphite cloth derived by carbonizing cellulose woven fibers was suspended in the reactor above the Alundum bed. As in Example VI, the Alundum bed was fluidized and the reactor heated to 800° C. $TiCl_4$ and Al were fed in the amounts stated. At the conclusion of the 1-hour run, the bed was cooled, and the piece of woven cloth was removed. The fibers were found to be completely transformed to $TiC$ while the woven texture of the cloth remained.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for producing a carbide in a desired structural shape comprising passing a vaporous halide of an element from the group consisting of chromium, columbium, iron, molybdenum, silicon, tantalum, titanium, tungsten, vanadium, and zirconium, through a fluidized bed containing inert particles in the lower portion of said bed and in the upper portion of said bed, carbon having the shape desired in the carbide while introducing a reducing agent capable of reducing the halide of the selected metal to the elemental state to said bed, said reducing agent being selected from the group consisting of aluminum, hydrogen, and combinations thereof when the element is from the group consisting of columbium, iron, molybdenum, silicon, tantalum, tungsten and vanadium, and from the group consisting of aluminum and combinations of aluminum with hydrogen when the element is from the group consisting of chromium, titanium and zirconium, said process being carried out at a temperature in the range of 700° to 900° C., and recovering a metal carbide having the structural shape of the carbon used in said bed.

2. The process of claim 1 in which the halide is titanium tetrachloride.

3. The process of claim 1 in which the halide is zirconium tetrachloride.

4. A process for producing a carbide in a desired structural shape comprising placing carbon having the shape desired in the carbide above a bed of inert particles maintained in a reaction zone, passing a vaporous halide of an element from the group consisting of chromium, columbium, iron, molybdenum, silicon, tantalum, titanium, tungsten, vanadium, and zirconium through said bed while introducing a reducing agent capable of reducing the halide of the selected metal to the elemental state, selected from the group consisting of aluminum, hydrogen, and combinations thereof when the element is from the group consisting of columbium, iron, molybdenum, silicon, tantalum, tungsten and vanadium, and from the group consisting of aluminum and combinations of aluminum with hydrogen when the element is from the group consisting of chromium, titanium and zirconium, to said bed and recovering from above the bed of inert particles the metal carbide in the shape of the carbon initially placed above the bed.

5. A process for preparing a carbide product in a desired structural shape which comprises reacting at a temperature in the range of 700° C. to 950° C. in an enclosed reactor having inlet and outlet connections, carbon having the shape desired in the said carbide product, and reactants consisting of (1) a vaporous halide of an element from the group consisting of chromium, columbium, iron, molybdenum, silicon, tantalum, titanium, tungsten, vanadium, and zirconium, and (2) a reducing agent capable of reducing to elemental metal the halide of the selected metal, said reducing agent being selected from the group consisting of aluminum, hydrogen, and combinations thereof when the element is from the group consisting of columbium, iron, molybdenum, silicon, tantalum, tungsten and vanadium, and from the group consisting of aluminum and combinations of aluminum with hydrogen when the element is from the group consisting of chromium, titanium and zirconium, and recovering a carbide product having the structural shape of the said carbon.

6. The process of claim 5 in which the reducing agent is hydrogen and the vaporous halide is columbium pentachloride.

7. The process of claim 5 in which the reducing agent is hydrogen and the vaporous halide is ferric trichloride.

8. The process of claim 5 in which the reducing agent is hydrogen and the vaporous halide is tantalum pentachloride.

9. The process of claim 5 in which the reducing agent is hydrogen and the vaporous halide is tungsten hexachloride.

10. The process of claim 5 in which the reducing agent is hydrogen and the vaporous halide is vanadium pentachloride.

References Cited by the Examiner

UNITED STATES PATENTS

| 2,532,295 | 12/50 | Gardner | 23—208 |
| 3,077,385 | 2/63 | Robb | 23—208 |

FOREIGN PATENTS

| 1,088,863 | 9/60 | Germany. |

OTHER REFERENCES

Campbell et al.: Article in Transactions of the Electrochemical Society, November 1949, vol. 96, No. 5, pages 318–333.

Carter, HD.: "Metal Carbides," metal industry (London) August 13, 1954, pages 123–125.

"Chemical Abstracts," vol. 44 (1950), page 5749.

Schwarzkopf and Kieffer, "Refractory Hard Metals," MacMillan Co., New York, pages 59 and 60, 1953.

MAURICE A. BRINDISI, *Primary Examiner.*